United States Patent
Hütter

(10) Patent No.: US 7,823,178 B2
(45) Date of Patent: Oct. 26, 2010

(54) METHOD FOR CONTROLLING A NETWORK STATION IN A NETWORK OF A FIRST TYPE FROM A NETWORK STATION IN A NETWORK OF A SECOND TYPE, AND CONNECTION UNIT FOR THE CONNECTION OF THE NETWORKS OF THE FIRST AND SECOND TYPES

(75) Inventor: Ingo Hütter, Pattensen (DE)

(73) Assignee: Thomson Licensing, Boulogne-Billancourt (FR)

(*) Notice: Subject to any disclaimer, the term of this patent is extended or adjusted under 35 U.S.C. 154(b) by 649 days.

(21) Appl. No.: 10/561,898

(22) PCT Filed: Jul. 1, 2004

(86) PCT No.: PCT/EP2004/007156

§ 371 (c)(1),
(2), (4) Date: Dec. 22, 2005

(87) PCT Pub. No.: WO2005/004404

PCT Pub. Date: Jan. 13, 2005

(65) Prior Publication Data

US 2006/0168354 A1 Jul. 27, 2006

(30) Foreign Application Priority Data

Jul. 3, 2003 (DE) ................ 103 30 201
Aug. 28, 2003 (DE) ................ 103 39 648

(51) Int. Cl.
*H04N 7/18* (2006.01)
(52) U.S. Cl. ............... 725/80; 710/2; 709/245; 709/249
(58) Field of Classification Search .......... 709/250
See application file for complete search history.

(56) References Cited

U.S. PATENT DOCUMENTS 6,665,020 B1 * 12/2003 Stahl et al. .......... 348/552

(Continued)

FOREIGN PATENT DOCUMENTS

| EP | 0705012 | 4/1996 |
|----|---------|--------|
| EP | 705012 A2 * | 4/1996 |
| EP | 1009171 | 6/2000 |
| EP | 1286501 | 2/2003 |
| EP | 1286501 A1 * | 2/2003 |

OTHER PUBLICATIONS

Search Report Dated Oct. 14, 2004.

*Primary Examiner*—Andrew Y Koenig
*Assistant Examiner*—Anthony Bantamoi
(74) *Attorney, Agent, or Firm*—Robert D. Shedd; Joseph J. Opalach; Jerome G. Schaefer

(57) ABSTRACT

The invention relates to the field of home networks, in particular the connection of two home networks of different types via a gateway. The network devices in the network of the first type are also intended to be able to control the network devices in the network of the second type, and vice versa. In the context of realizing control message conversions, the problem has arisen that, although direct conversions into the format of the other network are possible for many control messages, in some cases there is no correspondence for a control message in the device to be controlled. In order to convert such control messages, it is proposed to provide means in the network connection unit which check whether a data connection to a further network device is set up for the device to be controlled and, if the further network device has this device functionality, the conversion is effected such that the control message is converted into a corresponding control message for the further network device and is forwarded to the further network device.

9 Claims, 4 Drawing Sheets

U.S. PATENT DOCUMENTS

| | | |
|---|---|---|
| 6,683,868 B1 | 1/2004 | Couturier |
| 7,308,644 B2 * | 12/2007 | Humpleman et al. ... 348/E5.006 |
| 7,412,538 B1 * | 8/2008 | Eytchison et al. ........... 709/245 |
| 2002/0078161 A1 * | 6/2002 | Cheng ........................ 709/208 |
| 2003/0110334 A1 * | 6/2003 | Lanigan et al. ................. 710/72 |
| 2004/0227779 A1 * | 11/2004 | Weber et al. ................. 345/733 |
| 2005/0021852 A1 * | 1/2005 | Accarie et al. .............. 709/245 |
| 2005/0125357 A1 * | 6/2005 | Saadat et al. ................... 705/57 |

\* cited by examiner

METHOD FOR CONTROLLING A NETWORK STATION IN A NETWORK OF A FIRST TYPE FROM A NETWORK STATION IN A NETWORK OF A SECOND TYPE, AND CONNECTION UNIT FOR THE CONNECTION OF THE NETWORKS OF THE FIRST AND SECOND TYPES

The invention relates to the technical field of home networks. In particular, the invention is concerned with the area where a network of a first type, e.g. HAVi-based home network, is connected to a network of a second type, e.g. UPnP-based home network, via a gateway.

BACKGROUND OF THE INVENTION

For home networking of devices, various home network standards have become available in the meantime. The bus standard IEEE 1394, in particular, has become established in the art of entertainment electronics. Said standard enables communication between the entertainment electronics devices at a very high data rate. Data rates of 100, 200 and 400 Mbit/s are supported (even higher data rates will be supported in the future). This is enough to transmit both asynchronous data packets for controlling the network stations and isochronous audio and video data streams in parallel. However, the IEEE 1394 standard only specifies the lower layers of the ISO/OSI reference model for data communication, namely the physical layer, the data link layer and parts of the network layer. The higher layers, namely the transport layer, session layer, presentation layer and application layer, are unspecified, however.

A consortium of entertainment electronics companies has undertaken also to define the higher layers for data interchange between the entertainment electronics devices. This standard is known under the abbreviation HAVi, where HAVi stands for Home Audio/Video interoperability. This standard specifies a so-called interoperability middleware, which ensures that products from different manufacturers mutually understand one another, i.e. cooperate in order to jointly fulfill tasks via the network.

A different consortium of companies, in particular companies from the computer industry, headed by Microsoft, has started a different initiative for specifying a network control software based on the existing Internet Protocol (IP). This network system has become known under the abbreviation UPnP (Universal Plug and Play). In the case of this system, the specification is not primarily effected for entertainment electronics devices, rather other devices may also be integrated in the network, such as, in particular, personal computers, domestic appliances of white goods, such as refrigerators, microwave ovens, washing machines, and heating controllers, lighting controllers, alarm systems, etc.

Although the two home network standards HAVi and UPnP are sometimes regarded as competitors, they are nonetheless used at least in part for a different purpose, and a scenario is foreseen in which both networks exist alongside one another in a household, said networks being connected to one another via a gateway, however. It shall then become possible to control the devices in the UPnP network from the HAVi network, and vice versa. The connection unit between the two networks is referred to as "gateway" hereinafter. The term gateway is often differentiated from the term "bridge" that is likewise customary otherwise. The difference between a bridge and a gateway is seen in the fact that a bridge transfers the data packets on the data link layer to the respective other network, whereas in a gateway the data packets are already transferred on a higher layer in the ISO/OSI reference model.

Previous work on gateways for the connection of HAVi and UPnP networks has always been based on a so-called "proxy-based gateway" approach. This involves the following: in order that the UPnP network stations are visible from an HAVi device, the UPnP devices are represented on the HAVi side in the gateway by so-called HAVi-DCM code units. In this case, DCM stands for Device Control Module and forms an interface for controlling the general functions of a device. These additional DCMs are then logged on in the HAVi network and can be addressed from the HAVi devices. In this case, a DCM code unit is necessary for each UPnP network station. If the network station offers different functionalities, such as e.g. a customary television set having the functionality of a tuner, an amplifier and also a display device, then, in addition to the DCM, a number of so-called FCMs are provided, if appropriate, in a DCM code unit. In this case, an FCM is a so-called Functional Component Module which is thus used to cover an interface for controlling a specific device functionality.

Conversely, the HAVi network stations are also intended to be addressed from the UPnP side. On the UPnP side, an HAVi device is represented by a so-called UPnP device. Therefore, a corresponding UPnP device is also kept ready in the gateway for each HAVi network station. A so-called XML device description exists for each UPnP device. In this case, XML stands for the description language Extension Markup Language. The counterpart for an HAVi FCM on the UPnP side is a so-called "service". Therefore, a plurality of UPnP services may be described in a UPnP device. The conversion between HAVi DCM/FCM and UPnP devices/services is intended to be effected as completely as possible.

INVENTION

A comparison of the two standards reveals, however, that a complete conversion between HAVi and UPnP control commands is not always possible. Suppose that an HAVi-TV set is present in the HAVi network. This is represented in the HAVi network by an FCM of the "display" type or by an FCM of the "AV-display" type. The "AV-display" FCM is a combination of the "display" FCM with an "amplifier" FCM.

In order that this TV set becomes controllable from the UPnP side, a UPnP device representation has to be generated in the HAVi-UPnP gateway and the control commands have to be correspondingly converted between said representation and the HAVi-FCM. The UPnP device matching an HAVi display is a so-called "media renderer". However, a comparison of the functionalities of the two devices reveals a number of differences. In the case of the HAVi display, the following attributes can be set: contrast, hue, color, brightness, sharpness. The following can be set in the case of a UPnP device: contrast, hue, color, brightness, program, volume. Consequently, the UPnP functions for changing contrast, hue, color, brightness can be mapped without difficulty onto associated functions of the HAVi "display" FCM, but there are no counterparts for the functionalities for changing the program and the volume. This is due, inter alia, to the fact that the functionality of the program change in the HAVi system is contained in a "tuner" FCM. However, this "tuner" FCM is not necessarily part of the display DCM code unit.

The idea of the invention, then, consists in forwarding the UPnP functionalities which cannot be mapped directly onto the HAVi functionalities to an HAVi device connected to the respective HAVi device. By way of example, if the HAVi display is connected to an HAVi tuner (i.e. if there is a 1394 connection), then the control commands for changing the program can be forwarded directly to the tuner. If there is also a connection from the tuner to an audio amplifier, then the corresponding control commands for changing the volume can be forwarded thereto.

DRAWINGS

Exemplary embodiments of the invention are illustrated in the drawings and are explained in more detail in the description below. In the figures.

DESCRIPTION OF THE INVENTION

Figure 1:
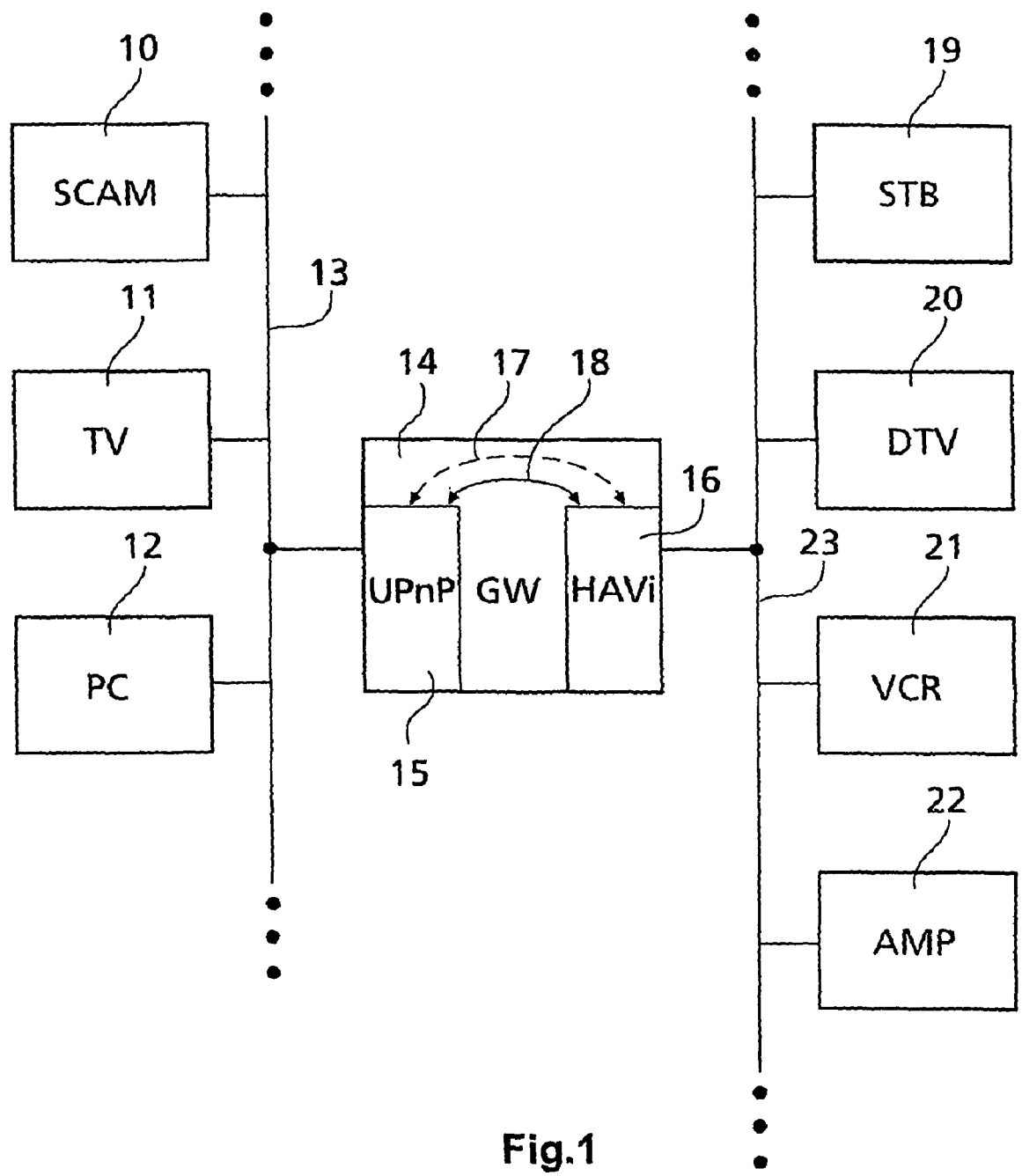
FIG. 1 shows an illustration of two home networks connected to one another via a gateway.

FIG. 1 shows the basic structure of two home networks connected to one another via a gateway (network connection unit). A UPnP-based home network is illustrated on the left-hand side of FIG. 1. The reference numeral 10 designates a monitoring camera as an example of a UPnP device. The reference numeral 11 designates a TV set as a further example of a UPnP network station. The reference numeral 12 additionally designates a personal computer, likewise integrated into the UPnP network. The UPnP devices are linked via a network connection 13. The widespread, known Ethernet bus is mentioned as a typical example of such a network connection 13.

An example of a home network designed according to the HAVi standard is shown on the right-hand side of FIG. 1. Reference numeral 19 designates a so-called set-top box, which is a receiving device for digital television. The reference numeral 20 designates a digital TV set of the HAVi display type. Such digital TV sets no longer have their own reception part, nor their own audio part. They obtain the digital video data from another device, e.g. the set-top box 19. In the case illustrated, however, the video data are transported via the network cable to the digital TV set 20. This may be configured such that the set-top box 19 generates an MPEG2 transport stream containing the audio and video data in multiplexed form. The digital TV set 20 then takes the video data from the transport stream, decodes them and displays the transmitted video content on the display.

The reference numeral 21 designates a video recorder. The reference numeral 22 designates an amplifier. The latter may likewise be supplied with the MPEG2 transport stream by the set-top box. The amplifier extracts the audio data from the transport stream, decodes them and reproduces the audio content via the loudspeakers.

The network cable is marked by the reference numeral 23. In the assumed case of the example of an HAVi network, this network cable 23 is realized by the so-called IEEE 1394 bus.

The gateway 14 is illustrated in the center of FIG. 1. It connects the two networks to one another. For this purpose, a so-called IP and UPnP stack 15, on the one hand, and a so-called HAVi stack 16, on the other hand, are present in the gateway 14. The IP stack 15 and HAVi stack 16 contain all the software components required for participation in the respectively connected network. In addition, the gateway 14 contains further software components, not listed separately. However, the illustration shows diagrammatically that data are interchanged between the two software stacks 15 and 16. In this case, reference numeral 17 designates the data path for the audio and video data streams. By contrast, reference numeral 18 designates the data path for the control messages to be interchanged between the two software stacks.

The HAVi standard and also the UPnP specification have been published. The HAVi specification is now in Version 1.1. The precise designation is: The HAVi Specification "Specification of the Home Audio/Video interoperability (HAVi) Architecture", Version 1.1, 15 May 2001. The UPnP specification can be obtained via the company Microsoft. There is also more detailed information on the official Internet page for the UPnP system. In this respect, attention is drawn to the Internet page www.UPnP.org.

Since not all the components of the HAVi and UPnP systems are important for explaining the invention presented, only the essential components are explained in more detail below. For further details, reference is expressly made to the two previously mentioned specifications with regard to the disclosure of the invention.

Figure 2:
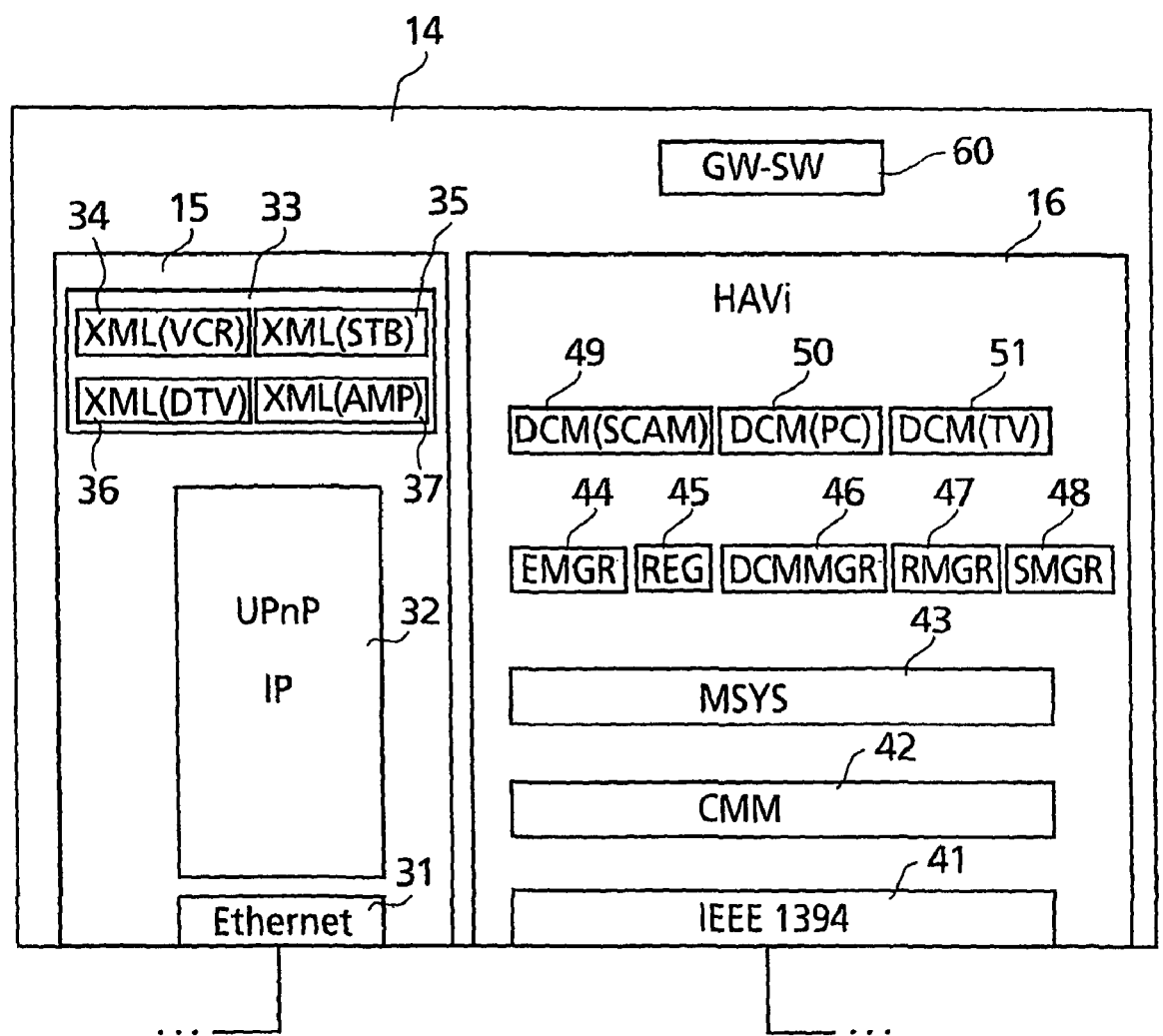
FIG. 2 shows software components of the gateway.

In FIG. 2, the same reference numerals designate the components which are also illustrated in FIG. 1. The essential software components of the gateway 14 are shown therein. As already explained with regard to FIG. 1, the gateway 14 comprises an Internet Protocol and UPnP stack 15 for communication in the UPnP network and an HAVi stack 16 for communication in the HAVi network. In this case, in the HAVi network, the gateway is designed as an FAV device, corresponding to full AV device. An FAV device has the highest upgrade level of software components in the HAVi network.

The IEEE 1394 interface 41 is illustrated at the bottommost level of the HAVi stack 16. Said interface is typically not embodied as a software component. Rather, the IEEE 1394 standard stipulates that both the physical layer and the data link layer must be embodied in hardware. Two separate ICs are typically used for this. The so-called communication media manager 42 is established above this as a software component. It forms parts of the network layer and transport layer and forms an interface between the other software elements and the IEEE 1394 bus.

The so-called messaging system 43 is implemented above the communication media manager 42. This component is a very important component in the HAVi standard since the messaging system is in each case used if two other software modules wish to interchange data among one another. The messaging system is independent of network and transport layers in the ISO/OSI reference model.

A further module of the HAVi stack is a so-called event manager 44. The task of the event manager 34 is to inform the various software elements in the network about changes/events that have occurred. Such events occur in particular whenever a device is added to the network or is disconnected from the network.

A further software component of the HAVi stack 16 is a so-called registry 45. The registry lists the available software elements of the network. The registry offers the service of searching for specific software elements. A software element that would like to communicate with other software elements in the network must be registered in the registry.

A further software element in the HAVi stack 16 is a so-called DCM manager 46. The latter has the task of installing the DCM code units for the respective network stations in FAV and IAV devices.

The resource manager 47 has the task of monitoring whether specific resources of the network are still available for a respectively requested task, or have already been allocated. It thus assigns corresponding resources to the application programs provided that they are free.

A so-called stream manager 48 is also present as a further component in the HAVi stack. It is responsible for setting up connections between network subscriber stations. AV data streams can then be transmitted via the connections set up.

Various DCM code units are also set up in the gateway above the software elements of the HAVi stack that have been described hitherto. A DCM code unit is a software element which is used on the HAVi side in order to control an associated HAVi device. Therefore, in order to control the UPnP devices, an associated HAVi DCM code unit is installed in the gateway in each case per UPnP device. For example, the reference numeral 49 designates the DCM code unit for the monitoring camera 10 in the UPnP network. The DCM code unit 50 serves to control the personal computer 12 in the UPnP network. For the TV set 11, too, there is an associated DCM code unit 51 present in the HAVi gateway 14. According to the HAVi specification, the other DCM code units of the HAVi network can also be installed in the HAVi gateway 14, but do not have to be so installed, as shown in the example of FIG. 2. The reference numeral 60 additionally designates the application program of the gateway 14.

Applications which are implemented in the HAVi network access a number of so-called FCMs (Functional Component Modules). The functionalities of various types of FCMs are specified in the HAVi standard itself. These include a tuner FCM, VCR FCM, clock FCM, camera FCM, AV disk FCM, amplifier FCM, display FCM, AV display FCM, modem FCM and webproxy FCM. It should be taken into consideration that, for an HAVi device, in an HAVi controller, in the general case it is possible to install a DCM for controlling the general functions of the HAVi device and also a number of FCMS. DCM and the FCMs are then combined in the so-called DCM code unit.

The IP and UPnP stack 15, likewise present in the gateway 14, is not shown with all its components. The construction of such a stack is known from the prior art. Therefore, in order to simplify the illustration, only one of the components is illustrated. That is a so-called HTTP web server 33. The latter comprises the various XML device descriptions for the devices present in the HAVi network. That is to say an XML device description 34 for the video recorder 21, an XML device description 35 for the set-top box 19, an XML device description 36 for the digital television set 20 and an XML device description 37 for the amplifier 22.

An Ethernet interface 31 is additionally shown below the remaining part of the IP and UPnP stack 32. Said Ethernet interface serves for coupling the gateway to the UPnP network.

Figure 3:
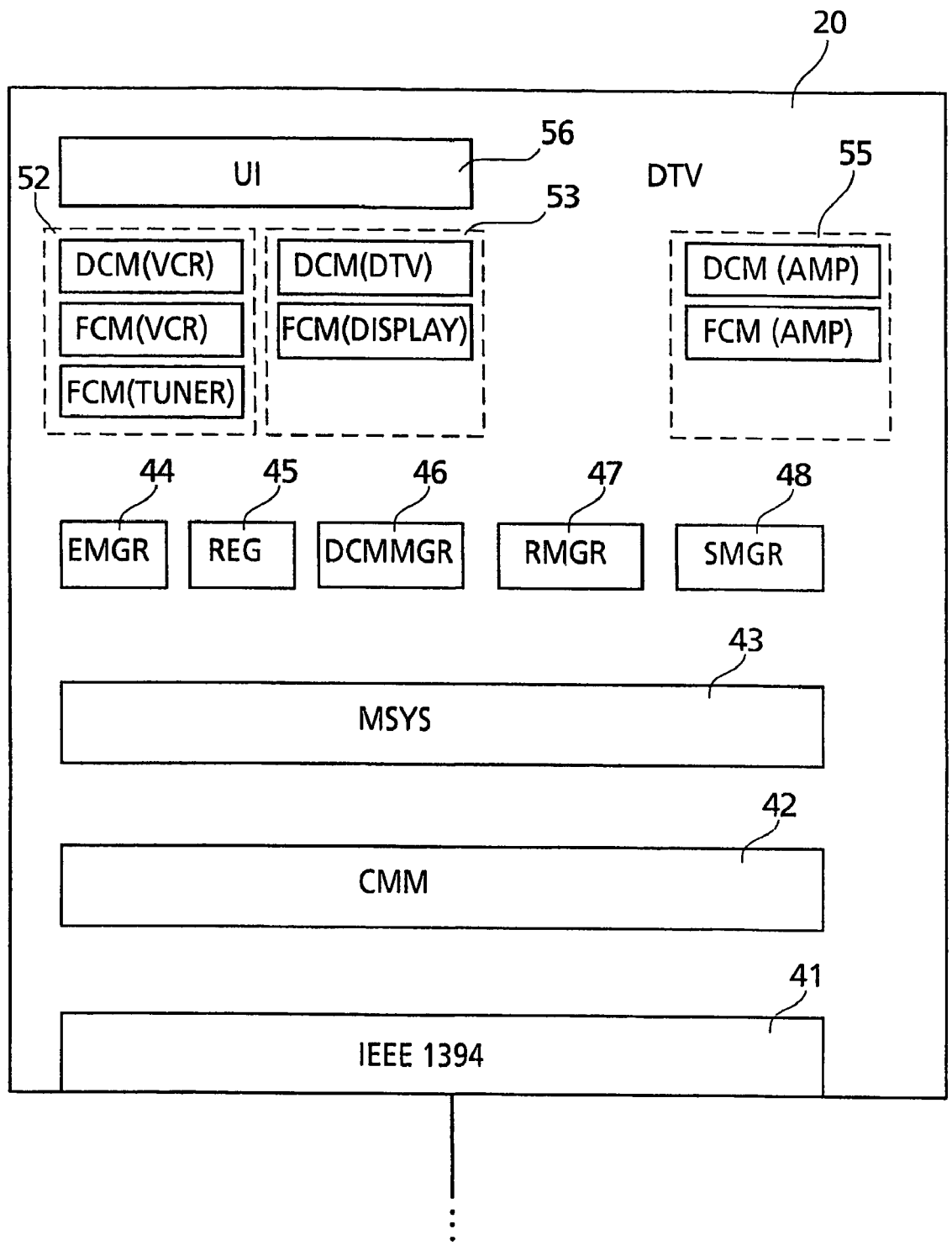
FIG. 3 shows software components of an HAVi display.

In FIG. 3, the individual software elements of the HAVi stack are likewise presented separately for the digital TV set 20. Since these components are designated by the same letter abbreviations and reference numerals as in the HAVi stack 16 of the gateway 14, these parts need not be explained again in detail.

The digital television set 20 is likewise assumed to be an FAV device in the exemplary embodiment. As already explained, such a device is equipped with the largest number of HAVi software elements. The special feature is that an FAV device also has integrated a so-called java virtual machine. The device is thus able to convert java code into executable program code and then to execute it correspondingly. An FAV device has the possibility of loading a DCM code unit from another HAVi network device. The DCM code unit is then installed in the FAV device alongside the DCM code unit of the FAV device. Therefore, FIG. 3 shows that the DCM code units 52 and 55 for controlling the video recorder 21 and the amplifier 22 are additionally installed alongside the DCM code unit 53 of the digital TV set 20. A user interface 56 is likewise illustrated as well.

Figure 4:
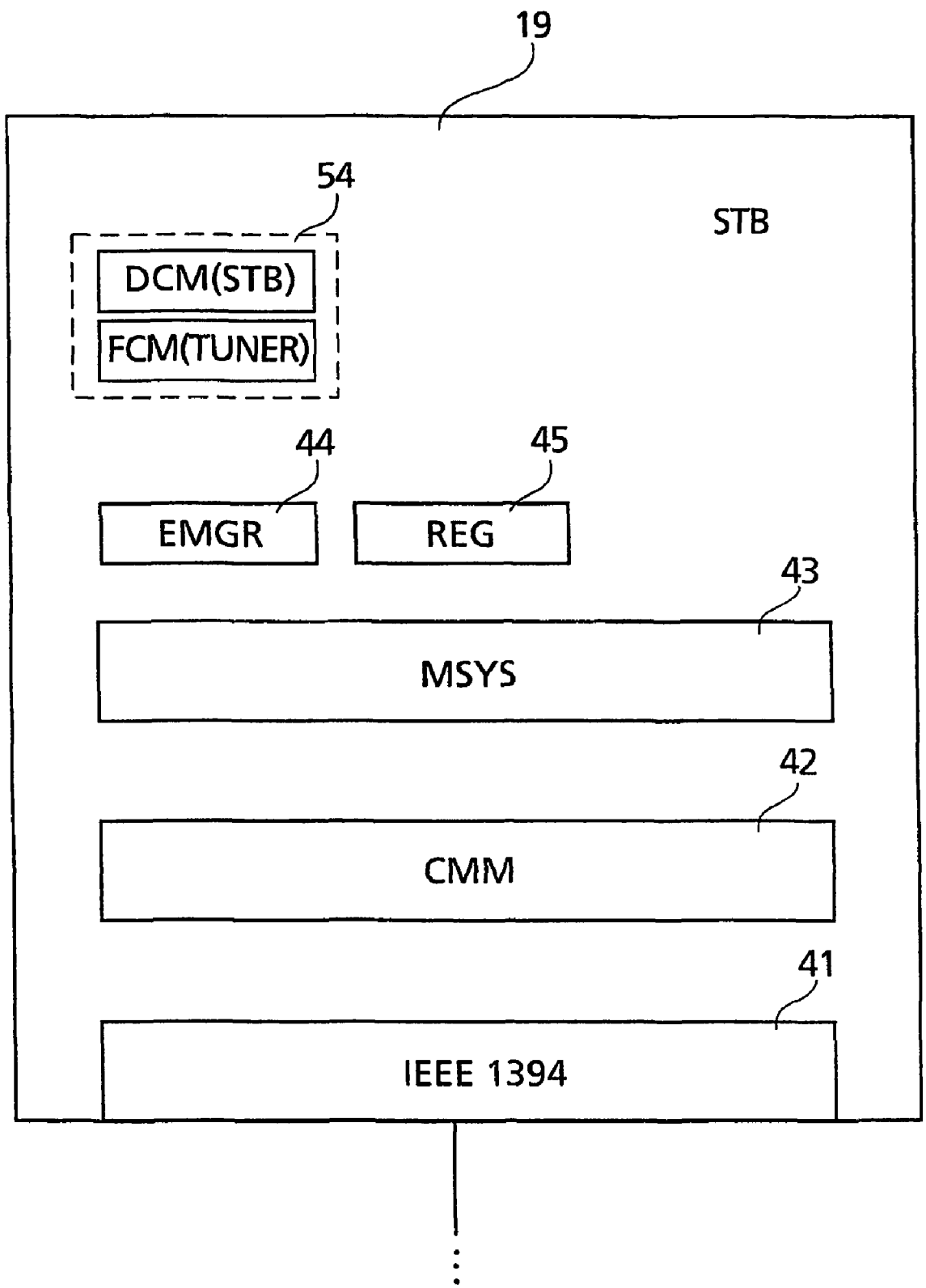
FIG. 4 shows software components of an HAVi tuner.

FIG. 4 additionally shows the software components of the set-top box 19. This device is classified as an IAV device (intermediate AV device). It thus comprises fewer software components than an FAV device. Most of the software components will not be mentioned again in detail since they have already been explained previously. A DCM code unit 54 for controlling the set-top box is additionally present as a further software component which has not been mentioned previously.

A description will now be given below of how the various software elements interact if devices in the HAVi network are intended to be controlled from the UPnP side. Since the HAVi stack 16 does not accept specified UPnP messages, however, the gateway software 60 must initiate/perform a translation of these messages into the format that is comprehensible to the HAVi stack 15. The associated UPnP message generated by the UPnP stack 15 may be based on the so-called SOAP protocol (Simple Object Access Protocol). Therefore, the gateway software 60 has to instigate or itself carry out a conversion of the SOAP message into the form of an HAVi message. Since both systems are specified, this conversion is possible without further difficulties for many UPnP messages.

It is assumed below that the HAVi display device 20 is intended to be controlled by the UPnP media renderer 11. According to the UPnP specification, the TV device has a series of services which can be used to alter device settings. These are, e.g. contrast, hue, color, brightness, program, volume. For the services contrast, hue, color, brightness, there are corresponding services in the HAVi display FCM, namely Display::SetContrast, Display::SetTint, Display::SetColor and Display::Brightness. The corresponding SOAP commands can thus easily be converted into the correct HAVi display FCM commands in the gateway software 60.

However, since no counterparts exist in the HAVi display FCM for program and volume setting, the procedure for the conversion is as follows.

Volume Setting

The gateway software 60 checks whether a set-up connection is registered for the HAVi display. For this purpose, it directs an inquiry to the stream manager 48 via the messaging system 43. If a connection is set up, e.g. to the set-top box 19, a check is made to determine whether the set-top box has set up a further connection to an amplifier FCM. If this is the case, the conversion of a command for volume setting is performed such that the command in the form Amplifier::SetVolume is directed to the amplifier FCM in the gateway 14. The latter transmits the corresponding HAVi message to the amplifier 22 via the IEEE 1394 bus 23.

Program Setting

If the command for program switchover, that is to say either prog+ or prog−, arrives from the UPnP TV set 11, then the gateway software 60 checks whether a connection to a tuner FCM is registered at the stream manager 48 for the HAVi display 20. If this is the case, the conversion of the command for program setting is performed such that the command in the form Tuner::SelectService is directed to the tuner FCM in the set-top box 19. The gateway 14 transmits the corresponding HAVi message to the set-top box 19 via the IEEE 1394 bus 23.

The invention can be used in particular in the case of a gateway which serves for connecting an HAVi network to a UPnP network. However, possibilities of use are also conceivable in the case of gateways which connect other networks to one another, for example an HAVi network to an OSGi network or a network based on powerline data transmission, such as EHS, to an IP network such as UPnP or OSGi.

The invention claimed is:

1. A method for controlling a first network station in a network of a first type from a second network station in a network of a second type the method comprising:
   providing, by a network connection unit, a connection between the network of a first type and a network of the second type;
   performing a conversion of a control command issued in a format of the network of the second type into a corresponding control command in a format of the network of the first type;
   directing, by the network connection unit, the corresponding control command to the first network station if the first network station provides a functionality corresponding to said control command;
   wherein a format of the corresponding control command is adapted to the first network station, wherein if the first network station does not provide the functionality corresponding to the control command, the network connection unit directs the corresponding control command to a third network station in the network of the first type, wherein the network connection unit determines the third network station by checking whether a connection setup is registered between said first network station and a further network station in the network of the first type which provides the functionality corresponding to the control command, and wherein the format of the corresponding control command is adapted to the third network station.

2. The method as claimed in claim 1, wherein if none of said further network stations in the network of the first type for which a connection is registered with said first network station provides a functionality corresponding to the control command, the network connection unit directs said corresponding control command to a fourth network station in the network of the first type, wherein the network connection unit determines said fourth network by checking whether a connection setup is registered between one of said further network stations and another network station in the network of the first type which provides a functionality corresponding to the control command, the format of the corresponding control command is adapted to the fourth network station.

3. The method as claimed in claim 1, wherein the first network station is a display device and the second network station is a TV set.

4. The method as claimed in claim 3, wherein upon arrival of a control command with regard to a program setting, a check is made by the network connection unit to determine whether the display device maintains a data connection set up with a tuner device, and, if so, that the control command is converted into a format matching the tuner device and the corresponding control command is transmitted to the tuner device.

5. The method as claimed in claim 2, wherein upon arrival of a control command with regard to a volume setting, a check is made by the network connection unit to determine whether the display device maintains a data connection set up to a video data source device, and, if so, whether a data connection between the video data source device and an audio device is furthermore set up, and, if so, the control command with regard to the volume setting is converted into a format matching the audio device and the corresponding control command is transmitted to the audio device.

6. The method as claimed in claim 1, wherein the network of the first type is a network based on the HAVi Standard, where HAVi stands for Home Audio/Video interoperability.

7. The method as claimed in claim 6, wherein the network of the second type is a network based on Internet Protocol, in particular UPnP, where UPnP stands for Universal Plug and Play.

8. The method as claimed in claim 7, the second network station being a UPnP TV or a media renderer issuing a control command with regard to a program setting, wherein the format of corresponding control command is the HAVi command Tuner::SelectService of a tuner FCM, where FCM stands for Functional Component Module.

9. The method as claimed in claim 7, the second network station is a UPnP TV or a media renderer issuing a control command with regard to a volume setting, wherein the format of corresponding control command is the HAVi command Amplifier::SetVolume of an amplifier FCM.

* * * * *